Patented Jan. 26, 1932

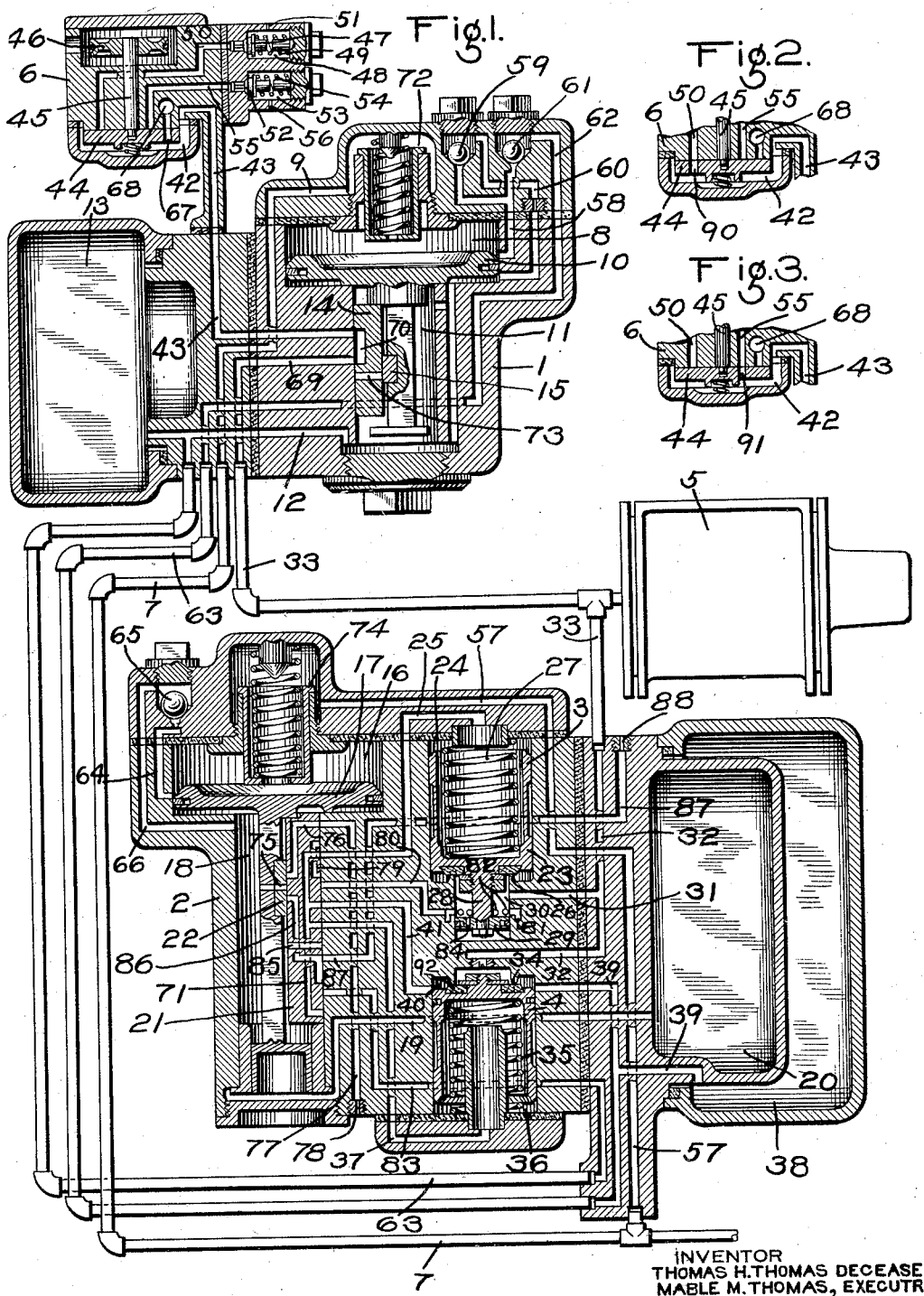

1,842,482

UNITED STATES PATENT OFFICE

THOMAS H. THOMAS, DECEASED, LATE OF EDGEWOOD, PENNSYLVANIA, BY MABLE M. THOMAS, EXECUTRIX, OF EDGEWOOD, PENNSYLVANIA, ASSIGNOR TO THE WESTINGHOUSE AIR BRAKE COMPANY, OF WILMERDING, PENNSYLVANIA, A CORPORATION OF PENNSYLVANIA

FLUID PRESSURE BRAKE

Application filed October 19, 1929. Serial No. 400,826.

This invention relates to fluid pressure brakes, and more particularly to a brake equipment having means for regulating the rate of build up of brake cylinder pressure during an emergency application of the brakes.

It has heretofore been proposed to provide a fluid pressure brake equipment in which in an emergency application of the brakes, an initial inshot of fluid under pressure is supplied to the brake cylinder, which is sufficent to move the brake cylinder piston out and bring the brake shoes into engagement with the car wheels. This is followed by supplying fluid under pressure to the brake cylinder at a slow rate for a time interval sufficient to permit the brakes to be gradually applied throughout the train. Finally, after the brake cylinder pressure has been gradually built up to a predetermined degree, a final inshot of fluid under pressure is supplied to the brake cylinder, in order to provide the desired high degree of brake cylinder pressure in an emergency application of the brakes. An equipment of the above character is disclosed in the prior patent of C. C. Farmer, No. 1,585,774, issued May 25, 1926.

One object of the invention is to provide an improved and simplified fluid pressure brake equipment of the above character.

Other objects and advantages will appear in the following more detailed description of the invention.

In the accompanying drawings; Fig. 1 is a diagrammatic view, mainly in section, of a fluid pressure brake equipment embodying the invention; Fig. 2 a fragmentary sectional view, showing the release controlling valve in its low pressure position; and Fig. 3 is a fragmentary sectional view, showing the release controlling valve in its high pressure position.

As shown in Fig. 1, the equipment may comprise a triple valve device 1, an emergency valve device 2, an inshot valve device 3, a delay valve device 4, a brake cylinder 5, a release controlling valve device 6, and a brake pipe 7.

The triple valve device 1 may comprise a casing having a piston chamber 8, connected through passage 9 with brake pipe 7, and containing piston 10, and a valve chamber 11, connected through passage 12 with an auxiliary reservoir 13, and containing a main slide valve 14, and a graduating slide valve 15, adapted to be operated by piston 10.

The emergency valve device 2 may comprise a casing having a piston chamber 16, connected through passage 57 with brake pipe 7 and containing piston 17 and having a valve chamber 18, connected through passage 19 with a quick action chamber 20 and containing a main slide valve 21, and a graduating slide valve 22, adapted to be operated by piston 17.

The inshot valve device 3 comprises a valve piston 23 having the chamber 24 at one side connected to a passage 25 leading to the seat of slide valve 21. The valve piston 23 is adapted in its down position to engage a seat rib 26 and is urged to this position by a coil spring 27. The valve piston 23 carries a stem 28, to which is secured a piston valve 29, and the chamber 30 intermediate the piston valve 29 and the valve piston 23 is connected, through passages 31 and 32 with pipe 33, leading to brake cylinder 5.

The delay valve device 4 comprises a valve piston having a valve seat 92 adapted to engage a seat rib 34 in its up position and said valve piston is urged to its up position by a coil spring 35.

The chamber 36 at the lower face of the valve piston 4 is connected to a passage 37, leading to the seat of slide valve 21. An emergency reservoir 38 is connected through passage 39 with chamber 40 at the upper face of the valve piston 4, and said chamber is also connected to a passage 41, leading to the seat of slide valve 21.

The release controlling valve device 6 comprises a casing having a valve chamber 42, connected to a passage 43, leading to the seat of slide valve 14 and containing a rotary slide valve 44, having an operating stem 45, which carries a wheel 46 adapted to be operated from a remote point by means of a cable (not shown).

A low pressure retaining valve 47 is mounted in valve chamber 48 and is subject to the pressure of a coil spring 49, said valve controlling communication from a passage 50, leading to the seat of rotary valve 44, to chamber 48, which is open to the atmosphere through a restricted port 51.

A high pressure retaining valve 52 is mounted in valve chamber 53 and is subject to the pressure of a coil spring 54, said valve controlling communication from a passage 55, leading to the seat of rotary valve 44, to valve chamber 53, which is open to the atmosphere, through a restricted port 56.

In operation, when the brake pipe 7 is charged with fluid under pressure in the usual manner, fluid flows from the brake pipe through passage 9 to piston chamber 8 of the triple valve device 1 and shifts piston 10 to release position, as shown in the drawings, Fluid then flows from piston chamber 8, through passage 58, past check valve 59, and through passage 60 to valve chamber 11, and from valve chamber 11, through passage 12 to the auxiliary reservoir 13, thus charging the auxiliary reservoir 13, and the valve chamber 11.

Fluid also flows from passage 58, past check valve 61 to passage 62, which is connected through pipe 63 and passage 39 with the emergency reservoir 38, so that the emergency reservoir is charged with fluid under pressure. Fluid under pressure flows from the brake pipe 7, through passage 57 to piston chamber 16 of the emergency valve device 2 and shifts the piston 17 to release position, as shown in the drawing.

In release position, fluid flows from piston chamber 16, through passage 64, past check valve 65, to passage 66 and then to valve chamber 18, and from valve chamber 18, through passage 19 to quick action chamber 20, so that said chambers are charged with fluid at brake pipe pressure.

With the rotary valve 44 of the release controlling valve device 6 in direct release position, as shown in Fig. 1, valve chamber 42 is connected, through a port 67 with an atmospheric exhaust port 68, and with the triple valve device in release position, the brake cylinder 5 is connected to the atmosphere, through pipe 33, passage 69, cavity 70 in slide valve 14 and passage 43, which opens to valve chamber 42.

With the emergency valve device 2 in release position, chamber 24 at the upper face of the inshot valve piston 23 is supplied with fluid under pressure from the emergency reservoir 38, through passage 39, chamber 40, passage 41, cavity 71 in slide valve 21, and passage 25. Chamber 36 at the lower face of the delay valve piston 4 is also charged with fluid at emergency reservoir pressure, through cavity 71 and passage 37.

Upon making a gradual reduction in brake pipe pressure to effect a service application of the brakes, the triple valve piston 10 is moved to a service position, where the piston engages the spring stop 72 and in which the port 73 in the main slide valve 14 registers with passage 69, said port having been previously uncovered by the preliminary movement of the graduating valve 15. Fluid under pressure is then supplied to the brake cylinder 5 in the usual manner to effect a service application of the brakes.

The gradual reduction in brake pipe pressure on the emergency piston 17 causes said piston to move into engagement with the spring stop 74, in which movement port 75 in the graduating valve 22 registers with port 76 in the slide valve 21.

Port 76 registers with a passage 77 leading to the atmosphere, through a restricted port 78, so that fluid under pressure is vented from the valve chamber 18 and the quick action chamber 20, at the same rate as the brake pipe pressure is reduced. The piston 17 is thus prevented from moving to emergency position, when a gradual reduction in brake pipe pressure is effected.

When the brake pipe pressure is suddenly reduced at an emergency rate, the triple valve piston 10 moves to emergency position, in which the slide valve 14 blanks passage 69, so that the triple valve device does not operate in emergency to supply fluid under pressure to the brake cylinder.

Upon a sudden reduction in brake pipe pressure, the emergency piston 17 moves out to emergency position, overcoming the resistance of the spring stop 74, and slide valve 21 is shifted to a position in which cavity 79 in the slide valve 21 connects passage 25 with exhaust passage 77. Cavity 71 in the slide valve 21 connects passage 41 with passage 80 which is connected to chamber 30, through an annular recess 81, having a plurality of openings 82, leading to said chamber.

Fluid under pressure from the emergency reservoir 38 is thus supplied to chamber 30 at a rapid rate and flows to the brake cylinder 5, through passages 31 and 32. Fluid under pressure is also supplied to the brake cylinder from the auxiliary reservoir 13, through pipe 63, passage 83, cavity 71, and passage 80.

Initially, fluid under pressure therefore flows from the auxiliary reservoir and from the emergency reservoir to the brake cylinder at a rapid rate. As the brake cylinder pressure builds up, the pressure in chamber 30 increases correspondingly, and when the pressure has been increased to a predetermined degree, sufficient to overcome the pressure of spring 27, the valve piston 23 is shifted, so that the valve seat is moved from the seat rib 26. The full area of the valve piston 23 is now exposed to brake cylinder pressure, and the valve piston is consequently shifted promptly to its up position. In this position, the piston 29 cuts off direct communication from the ports 82 to passage 31, and as these ports now open at the under face of the piston 29, fluid can only flow from passage 80 to passage 31 by way of a restricted port 84 through the piston. Fluid under pressure is now supplied only at a restricted rate to the brake cylinder, as determined by the size of the restricted port 84.

In the emergency position of the slide valve 21, a through port 85 registers with passage 37, so that chamber 36, below the valve piston 4 is connected to valve chamber 18. The valve chamber 18 and the quick action chamber 20 are connected, through a port 86 in slide valve 21 with a passage 87, having communication with the atmosphere, through a restricted port 88, so that fluid under pressure in the valve chamber 18, the quick action chamber 20, and in chamber 36 is slowly vented to the atmosphere at a rate determined by the restricted port 88.

The inner seated area at the upper face of valve piston 4 is subject to brake cylinder pressure, as supplied through passage 32 and to emergency reservoir pressure acting in chamber 40 at the outer area of the valve piston and when the fluid pressure below the valve piston has been reduced to a predetermined degree and the brake cylinder pressure has been increased to a predetermined degree, the fluid pressures acting on the upper face of the valve piston will overcome the reduced fluid pressure acting in chamber 36 and the pressure of spring 35, and the valve piston will be shifted downwardly, so that communication is opened from the emergency reservoir, as well as from the auxiliary reservoir to the brake cylinder, such that a rapid flow of fluid under pressure to the brake cylinder is effected.

It will now be seen that in effecting an emergency application of the brakes, a quick inshot of fluid under pressure is initially supplied from the emergency reservoir and the auxiliary reservoir to the brake cylinder, the pressure being sufficient to move the brake cylinder piston out and cause the brake shoes to engage the wheels. This is followed by a slow build up of brake cylinder pressure during a time interval sufficient to permit the brakes to be gradually applied throughout the train, but not with such force as to cause severe shocks. Finally, after the brake cylinder pressure has been gradually built up to a predetermined degree, a final rapid inshot of fluid under pressure is admitted to the brake cylinder, in order to provide the desired high degree of brake cylinder pressure in an emergency application of the brakes.

Referring to the release controlling valve device 6, if the rotary valve 44 is set to the position shown in Fig. 1, the brake cylinder exhaust passage 43 is connected to the atmospheric exhaust port 68, so that in releasing the brakes, the fluid under pressure in the brake cylinder is completely exhausted from the brake cylinder.

If it is desired to retain a low pressure in the brake cylinder in releasing the brakes, the rotary valve 44 is set to the low pressure position shown in Fig. 2, in which port 90 in the rotary valve 44 connects chamber 42 with passage 50. The retaining valve spring 49 is adjusted for the desired low pressure, so that the retaining valve 47 closes when the brake cylinder pressure has been reduced by flow through the restricted port 51, to said low pressure.

To retain a higher pressure in the brake cylinder, the rotary valve 44 is set to the high pressure position, as shown in Fig. 3, in which port 91 in the rotary valve registers with passage 55. The pressure retained in the brake cylinder is then controlled by the retaining valve 52, according to the pressure exerted by spring 54.

While one illustrative embodiment of the invention has been described in detail, it is not the intention to limit its scope to that embodiment or otherwise than by the terms of the appended claims.

Having now described the invention, what is claimed as new and desired to be secured by Letters Patent, is:

1. In a fluid pressure brake, the combination with a brake pipe, a source of fluid under pressure, and a brake cylinder, of a valve device operated upon a sudden reduction in brake pipe pressure for applying fluid under pressure from said source to the brake cylinder at a rapid rate, said valve device being operated upon a predetermined increase in brake cylinder pressure for restricting the rate of flow of fluid from said source to the brake cylinder.

2. In a fluid pressure brake, the combination with a brake pipe, a source of fluid under pressure, and a brake cylinder, of valve means for controlling the supply of fluid under pressure from said source to the brake cylinder, and a valve device operated only upon a sudden reduction of brake pipe pressure for supplying fluid under pressure from said source to said valve means, said valve means being operated upon a predetermined increase in brake cylinder pressure for restricting the rate of flow of fluid from said source to the brake cylinder.

3. In a fluid pressure brake, the combination with a brake pipe, a source of fluid under pressure, and a brake cylinder, of a service valve device operated upon a gradual reduction in brake pipe pressure for supplying fluid under pressure to the brake cylinder, a valve device operated upon a sudden reduction in brake pipe pressure for supplying fluid under pressure from said source to the brake cylinder, and valve means operated upon an increase in brake cylinder pressure for restricting the rate of flow of fluid from said source to the brake cylinder.

4. In a fluid pressure brake, the combination with a brake pipe, a source of fluid under pressure, and a brake cylinder, of a service valve device operated upon a gradual reduction in brake pipe pressure for supplying fluid under pressure to the brake cylinder, a valve device operated upon a sudden reduction in brake pipe pressure for supplying fluid under pressure from said source to the brake cylinder, and valve means normally establishing communication through which fluid under pressure is supplied to the brake cylinder by said valve device and operating upon a predetermined increase in brake cylinder pressure for restricting the rate of flow of fluid from said source to the brake cylinder.

5. In a fluid pressure brake, the combination with a brake pipe, brake cylinder, and auxiliary reservoir, of an emergency reservoir normally charged with fluid under pressure, a service valve device operated upon a gradual reduction in brake pipe pressure for supplying fluid under pressure from the auxiliary reservoir to the brake cylinder and an emergency valve device operated upon a sudden reduction in brake pipe pressure for supplying fluid under pressure from the auxiliary reservoir and the emergency reservoir to the brake cylinder.

6. In a fluid pressure brake, the combination with a brake pipe, brake cylinder, and auxiliary reservoir, of an emergency reservoir normally charged with fluid under pressure, a service valve device operated upon a gradual reduction in brake pipe pressure for supplying fluid under pressure from the auxiliary reservoir to the brake cylinder, an emergency valve device operated upon a sudden reduction in brake pipe pressure for supplying fluid under pressure from the auxiliary reservoir and the emergency reservoir to the brake cylinder, and valve means operated upon a predetermined increase in brake cylinder pressure for restricting communication through which said emergency valve device supplies fluid under pressure to the brake cylinder.

7. In a fluid pressure brake, the combination with a brake pipe and brake cylinder, of a combined inshot and cut-off valve device for controlling the rapid supply of fluid under pressure to the brake cylinder and operated upon a predetermined increase in brake cylinder pressure for cutting off said rapid supply of fluid to the brake cylinder and valve means operated upon a sudden reduction in brake pipe pressure for rendering said valve device operative by a predetermined increase in brake cylinder pressure.

8. In a fluid pressure brake, the combination with a brake pipe, brake cylinder, auxiliary reservoir and emergency reservoir, of a combined inshot and cut-off valve device for controlling the rapid supply of fluid from both reservoirs to the brake cylinder and operated upon a predetermined increase in the pressure of fluid supplied to the brake cylinder for cutting off the rapid supply of fluid to the brake cylinder, and valve means operated upon an emergency reduction in brake pipe pressure for rendering said valve device operative by a predetermined increase in brake cylinder pressure.

9. In a fluid pressure brake, the combination with a brake pipe and brake cylinder, of a valve device for controlling the rapid supply of fluid under pressure to the brake cylinder, and operated upon a predetermined increase in the pressure of fluid supplied to the brake cylinder for cutting off the rapid supply of fluid to the brake cylinder, and valve means operative upon a rapid reduction in brake pipe pressure for rendering said valve device operative by said predetermined increase in pressure.

10. In a fluid pressure brake, the combination with a brake pipe, brake cylinder, auxiliary reservoir, and emergency reservoir, of a valve for supplying fluid under pressure from the auxiliary reservoir and the emergency reservoir to the brake cylinder, means operative upon a predetermined increase in the pressure of fluid supplied to the brake cylinder for effecting the closure of said valve, and valve mechanism operative upon a sudden reduction in brake pipe pressure for rendering said means operative by said predetermined increase in pressure.

In testimony whereof I have hereunto set my hand.

MABLE M. THOMAS,
*Executrix of the Last Will and Testament of Thomas H. Thomas, Deceased.*